US005694373A

United States Patent [19]
Garde

[11] Patent Number: 5,694,373
[45] Date of Patent: Dec. 2, 1997

[54] SONIC WAVE SYNCHRONIZER

[76] Inventor: Lawrence Garde, 8021 Oakmere Rd., Bloomington, Minn. 55438

[21] Appl. No.: 689,737

[22] Filed: Aug. 13, 1996

[51] Int. Cl.⁶ ................................................ H04B 1/00
[52] U.S. Cl. .................................... 367/135; 267/903
[58] Field of Search ............................ 367/135, 137, 367/96, 97, 903; 310/334, 316

[56] References Cited

U.S. PATENT DOCUMENTS

| | | | |
|---|---|---|---|
| 4,122,427 | 10/1978 | Karsh | 367/97 |
| 4,197,856 | 4/1980 | Northrop | 128/661.07 |
| 4,199,246 | 4/1980 | Muggli | 367/96 |
| 4,914,638 | 4/1990 | Milner | 367/90 |
| 5,113,116 | 5/1992 | Wilson | 310/316 |
| 5,216,338 | 6/1993 | Wilson | 310/316 |

OTHER PUBLICATIONS

Biber et al.; Ultrasonic Ranging System Handbook; Polaroid Corporation; Cambridge, MA; pp. 1–14 1980.
Special Purpose Linear Devices; National Semiconductor; Santa Clara, CA; pp. 5–103 1989.
Electrostatic Transducer Provide Wide Range Ultrasonic Measurement; Linear Aplications Handbook; National Semiconductor; Santa Clara, CA; pp. 1083–1084 1986.

*Primary Examiner*—Daniel T. Pihulic

[57] ABSTRACT

A general-purpose, adaptable, device for interfacing acoustic and ultrasonic transducers to circuits for high resolution distance and motion measurement, and two-way communication. A generator signal (52) synchronizes to a sensing transducer signal (21), or a reference signal (23). A detector (20) provides a detected-cycle signal (22) and a detected-amplitude signal (24) from the signal being detected. Comparator (30) creates a comparator signal (32) from the detected-cycle and generator signals. A sustaining circuit provides flywheel operation during gaps. A driver (60) drives a radiating transducer. Options include: single or dual transducer operation, continuous or pulsed-burst operation, optimum frequency communication using low cost piezo-electric transducers, sonic wave frequency scanning, phase and amplitude modulation and demodulation, fast synchronization, detected vs reference signal comparison, and self-testing.

20 Claims, 3 Drawing Sheets

SONIC WAVE SYNCHRONIZER

FIELD OF THE INVENTION

This invention relates in particular to electronic devices which use sound waves: for measurement, for communicating, for energy transmission or for operating acoustic devices.

BACKGROUND

Sonic devices are being used in a broad range of products. They have for many years been used in depth sounders, cameras, and in medical analysis machines, but now they are being incorporated into automobiles, sporting goods, for transmission of acoustic sound and data on an ultrasonic carrier, and for a multitude of other items. Sonics are becoming important in the world of measurement and control. At low power levels sonic waves provide non-intrusive and safe methods for object detection and distance measurement.

There are many methods used in interfacing sonic transducers to electronic circuits, but they are usually specific to the particular application. There are few general purpose circuits to simplify the interfacing problems.

Commercially available interface circuits are designed for pulsed-burst mode operation. These interface circuits radiate short sonic chirps and detect the amplitude of the returned signal from the sensing transducer. They are used for distance and motion measurement. A typical example is an ultrasonic ranging system marketed by the Poloroid Corporation 119 Windsor Street, Cambridge, Mass. 02139. This is disclosed in U.S. Pat. No. 4,199,246 by Muggli 1980. This circuit is specifically designed to use a single capacitive broad bandpass transducer in the pulsed-burst mode. Another example is the LM1812 Ultrasonic Transceiver marketed by National Semiconductor, 2900 Semiconductor Drive, P.O. Box 58090, Santa Clara, Calif. 95052-8090. This is designed to use a single piezoelectric transducer in the pulse-burst mode.

Interface circuits for sending and receiving a continuous sonic signal for improved resolution are specifically designed to suit the particular application and are not suitable for use as general purpose sonic interface circuits. Typical examples of this type of interface circuit are disclosed in U.S. Pat. No. 4,122,427 by Karsh, 1978 and U.S. Pat. No. 4,197,856 by Northrop, 1980. These circuits are used for high resolution motion measurement and provide a clock signal synchronized to the signal from the sensing transducer. They detect phase change and provide no amplitude detection They lose synchronism in signal gaps therefore they are not adaptable for pulse-burst, or single transducer operation.

There is partial disclosure of the present invention in US Continuation in part dated Jan. 14. 1994, of original application Ser. No. 08/011,369, filed Jan. 29,1993, now abandoned.

A sonic interface circuit is needed to satisfy the above needs. It should preferably adapt to user circuits, such as microprocessors.

SUMMARY

The present invention is a sonic wave synchronizer interface circuit, invented to satisfy the needs described in the Background Section. It converts signals provided by an external user circuit into signals for driving a radiating sonic transducer, and detects the amplitude of the sensing transducer signal. It detects phase variations in the sensing transducer signal by comparison with an internal generator signal synchronized to an average of the input signal frequency. A reference input gives it self-test and signal comparison capability.

The basic synchronizer circuit can be adapted to make distance and motion measurements in the continuous, chopped, and pulsed-burst operating modes. It can adapt to control separate or shared transducers for radiating and sensing, and has many uses throughout the sound range.

Two Generator Types

The synchronizer is made using a stimulated tuned amplifier generator or a phase-locked-loop driven generator.

Flywheel Operation

When used in a receiving mode, the synchronizer produces a generator signal synchronized to an average frequency of the sensed sonic waves. The generator signal is sustained at that average frequency when sonic waves are intermittent, and when they cease being received. A sustaining circuit reduces frequency change in the absence of a detected signal to a slow drift rate. This enables the synchronizer to operate in a chopped or pulsed-burst mode.

Reference Signal

A reference signal input may be used to synchronize the generator signal at the desired initializing, or continuing radiating frequency. It can provide a variable radiating frequency for scanning a sonic frequency range, or for radiating modulated sonic waves, and it is useful as a comparison signal when measuring sonic wave strength, or for testing the synchronizer circuit.

Amplitude and Phase Modulation and Demodulation

The synchronizer provides a detected-amplitude signal in proportion to an average amplitude of either the sensing transducer signal or the reference signal. It also provides a detected-cycle signal from each cycle of the signal being detected. Amplitude modulation can be measured from the detected-amplitude signal. Likewise phase modulation of either the transducer signal or reference signal can be measured from a comparator output signal which combines digital transitions from the generator signal and the detected-cycle signal. A detector control signal makes the input signal selection.

A phase adjusting circuit in the comparator circuit is used to align phase relationships within the synchronizer for low drift conditions and can be used to introduce phase modulation into the generator signal for phase modulating radiated waves responding to a phase modulation signal from the user circuit.

A driver circuit interfaces with the radiating transducer and can include a circuit for amplitude modulating the radiated waves responsive to an amplitude modulation signal. Phase modulation may be introduced in the driver circuit by means of a modulated delay circuit (not shown) responding to a phase control signal.

Single Transducer Operation

A single transducer can be used for both radiating and sensing. An analog switch in the driver controlled by a radiate control signal isolates the driver from the transducer while the single transducer is sensing.

Transducer Radiating Current Measurement

A drive-current signal from the driver provides a signal responsive to the alternating current flowing in the radiating transducer.

Synchronization and Sensitivity

A frequency adjuster circuit responding to the comparator signal adjusts the generator signal frequency to be at a moving average of the frequency of the detected-cycle signals. A sensitivity control input adjusts the response of the frequency adjuster to determine the period over which the averaging will take place. When the sensitivity control input is provided by the detected-amplitude signal, the averaging period will decrease as the detected-amplitude signal responds to an increase in the input signal amplitude. This results in the generator signal being most responsive to the highest amplitude input signal. The sensitivity control signal can be used to provide fast synchronization to the input signal under control of the user circuit.

Optimizing Transducer Radiation

During the radiating mode the drive-current signal provides the reference signal, while the detector is switched to detect it. The generator responds by synchronizing to the detected-cycle signal and adjusting its frequency to maximize the alternating current in the radiating transducer, sensitized by the detected-amplitude signal. The peaking admittance characteristic of a radiating piezoelectric transducer will caused it to automatically radiate at the optimum radiating frequency.

Limited Frequency Detection

A filter is usually included in the detector circuit to limit its frequency passband sensitivity when the sensing transducer has a broad frequency passband.

Communication

Two-way directionally controlled wire-legs communication via sound waves is possible through elastic mediums. The sonic wave synchronizer provides a versatile sonic interface circuit which adapts for two way communication by amplitude and phase modulated signals.

BRIEF DESCRIPTION OF DRAWINGS

FIG. 10. Preferred embodiment of frequency adjuster 40a and tuned amplifier 50a.

DEFINITIONS

For Clarity and Brevity

Sound.—A vibration which can be heard, and also that which is beyond human hearing and travels at the speed of sound through an elastic medium.

Acoustic sound.—That sound which can be heard by a human being.

Sonic.—Having to do with sound, including acoustic sound, ultrasonic, or ultrasound. Having waves which propagate at the speed of sound (about 331.3 meters per second in air).

Medium.—An intervening elastic element through which a sonic wave will propagate at the speed of sound. eg. liquids, solids, gaseous substances.

Sonic wave.—An undulating cyclical displacement of medium particles oscillating within a small distance about an undisturbed mean position. Each wave transmitting pressure energy by propagating an adjacent wave through the medium away from the source or reflecting surface. The wave propagation rate being at the speed of sound, eg. a 40 kHz. vibration traveling at 331.3 m/sec. propagates waves 8.2825 mm. in length.

Returning sonic waves.—Sonic waves sensed by a sound transducer providing input to a synchronizer circuit which were originally transmitted by that synchronizer. They may be reflected from a surface, or re-radiated by another synchronizer circuit.

Sensing transducer.—A sonic transducer which is sensing sonic waves in a medium and producing an electrical signal, referred to in this disclosure as the sensing transducer signal. The identical sonic transducer may also be referred to as the sensing transducer when it is performing as a single alternating sense/radiate transducer.

Radiating transducer.—A sonic transducer which is radiating sonic waves into a medium, responsive to an electrical signal, referred to in this disclosure as the driver signal. The identical sonic transducer may also be referred to as the sensing transducer when it is performing as a single alternating sense/radiate transducer.

Generator—A device for producing an oscillating signal. It may include oscillating signals at higher frequencies than the frequency of generator signal 52 and may include more than one tuned circuit, or no tuned circuits.

DETAILED DESCRIPTION

Figure 1:
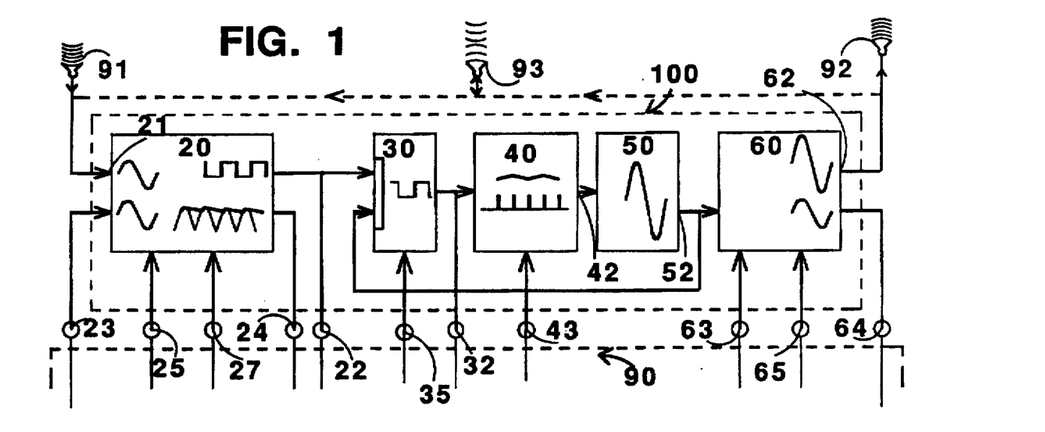
FIG. 1. Basic synchronizer schematic.

FIG. 1. shows basic synchronizer 100 radiating sonic waves from transducer 92 (optionally single transducer 93) and sensing sonic waves with transducer 91 (optionally single transducer 93). Transducer 93 is optionally used to alternately radiate and sense waves. The synchronizer is controlled by signals from user circuit 90. Detector 20 detects either a reference signal 23 supplied by, or via, user circuit 90, or detects a transducer signal 21 from transducer 91 (optionally 93). Detector control signal 25 from user circuit 90 selects the signal to be detected by means of a two input analog switch. The selected signal is amplified and produces a detected-amplitude signal 24 and a detected-cycle signal 22. The detected-amplitude signal 24 is an analog signal responsive to the amplitude of the signal being detected, and the detected-cycle signal 22 is a digital signal having at least one digital transition responsive to each cycle of the signal being detected.

A comparator circuit 30 receives detected-cycle signal 22 and also a generator signal 52 from a generator circuit 50. Comparator 30 produces a signal which is usually digital and preferably a square waveform having transitions responsive to detected-cycle signal 22 and to generator signal 52. The time separation between comparator signal transitions is responsive to the frequency and phase difference between detected-cycle 22, and generator 50, signals.

An adjuster circuit 40 receives comparator signal 32 and produces a frequency adjuster signal 42 responsive to the time period between selected transitions in comparator signal 32. Frequency adjuster signal 42 is received by generator 50 to adjust the frequency of generator signal 52. The sensitivity of frequency adjuster signal 42 to comparator signal 32 is controlled by sensitivity control signal 43. Comparator 30, frequency adjuster 40, and generator 50 cooperate to provide generator signal 52 which has good stability and will synchronize to a moving average frequency and phase position of detected-cycle signal 22.

A driver circuit 60 receives generator signal 52 and produces driver signal 62 responding to the frequency of generator signal 52. The driver signal is used to drive a radiating transducer 92 (optionally 93) such that it radiates sonic waves. The alternating drive current flowing in the radiating transducer is measured and produces a drive-current signal 64. A circuit may be included for selectively shutting off driver signal 62 to prevent it from driving the radiating transducer, responding to a radiate control signal 65. Preferably this circuit includes an analog switch for disconnecting transducer 92 (optionally 93) from driver 60. Driver 60 can amplitude modulate driver signal 62 by including a mixing circuit, or gain controlled amplifier responsive to an amplitude modulation signal 65.

Flywheel Operation

Comparator 30 and frequency adjuster 40 cooperate to present a neutral frequency adjuster signal to generator 50 input when no detected-cycle signal is produced by detector 20. The frequency of generator signal 52 will not be urged to change when the detected cycle signal is missing. See FIGS. 9 and 9a. This flywheel effect sustains the frequency of generator 50 when in the radiating mode using a single transducer 93 and during signal blanking gaps between the radiating and sensing modes, to avoid the damped self-oscillation inherent to most sonic transducers immediately after radiating periods, and on other occasions when the detected-cycle signal is not present.

The preferred digital square-shaped waveform of comparator signal 32 has one transition responding to detected cycle signal 22 and a second transition responding to generator signal 52. The period between the first and second transitions is adjusted to be equal, on average, by means of a phase adjustment circuit in comparator 30. Phase-neutral transitions may be inserted in place of missing detected-cycle transitions.

Modulation and Demodulation

Generator signal responsive transitions of comparator signal 32 can be used by user circuit 90 as a high inertia, stable dock for demodulating modulation in the detected cycle responsive transitions. When detector 20 detects the sensing transducer signal, sonic wave modulation is easily interpreted from comparator signal 32. Sensitivity control signal 43 is normally set for low sensitivity during phase demodulation to give generator signal 52 more stability, but it can be set for high sensitivity to achieve fast synchronization.

Phase modulation may be introduced into generator signal 52 for modulating radiated sonic waves, by making the phase control circuit in comparator 30 responsive to a phase modulation signal 35. Alternatively, reference signal 23 may be a phase modulated to introduce modulation into the radiated waves. Sensitivity control signal 43 is normally set for high sensitivity during phase modulation so that generator signal 52 follows the modulation. If synchronizer 100 does not include the sensitivity control circuit phase modulation may be introduced in driver circuit 60 by means of a modulated delay circuit (not shown) responding to phase control signal 35.

Transducer Signal Amplitude Range and AGC

Detector 20 operates over a wider range of input signals if it includes a gain controlled amplifier responsive to a gain control signal. Preferably the amplifier is connected to detected amplitude signal 24 to form an automatic-gain-control (AGC) circuit. The amplitude range of input signals is responsive to amplitude control signal 27 See FIG. 8.

The Reference Mode of Operation

Reference signal 23 makes synchronizer 100 adaptable to many applications. Providing: means for totally testing synchronizer 100, a standard signal with which to compare traducer signal 21, an encoded phase-modulated driver signal 62, a reference frequency for centering the radiated waves within the receiving range of the sensing transducer and the adjustment range of frequency adjuster 40, a means for scanning through a range of radiated frequencies, and a means for locking the radiating frequency to the admittance characteristic of the radiating transducer to optimize sonic wave radiation.

Figure 2:
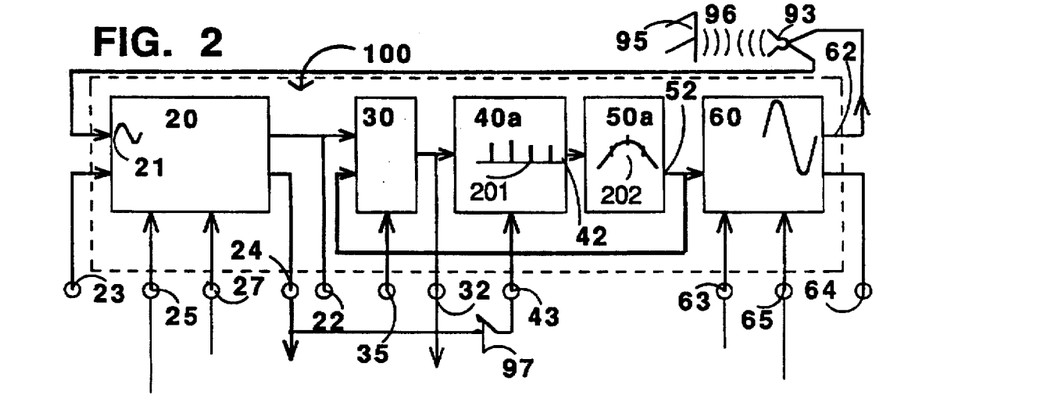
FIG. 2. Tuned amplifier synchronizer schematic.

FIG. 2 shows synchronizer 100 operating a single sonic transducer 93, alternately radiating and sensing bursts of sonic waves. The waves travel in medium 96 and reflect from surface 95. In this embodiment generator 50 is of the tuned amplifier type. Reference signal 23 is not required because the tuned amplifier resonant frequency is the synchronizer reference frequency. This embodiment is useful for accurate measurement of Doppler modulation in received reflected waves, distance measurement, ultrasound scanning, and totally synchronous communication.

Three modes are used for this application; a radiating mode, a sustaining mode, and a receiving mode. The sustaining mode fills a gap following the radiating mode to allow time for damped self-oscillation to dissipate. The "ringing" occurs in most sonic traducers after a radiating period. Synchronization is sustained during the radiating mode, and in the gap, and when no sonic waves are being sensed.

Radiating Mode

Driver 60 includes an analog switch responsive to radiate control signal 65, for switching transducer 93 into the radiating mode. Radiating, detector 20 is isolated from transducer 93, responding to detector control signal 25. With no input signal, detector 20 cannot produce detected-cycle signal 22, therefore, comparator 30 provides a phase-neutral output signal to frequency adjuster 40a. In a preferred embodiment comparator signal 32 inserts sustaining transitions in place of detected-cycle triggered transitions. See FIG. 9a. Sustaining transitions are derived from generator signal 52, and are phase adjusted to have a neutral effect on the generator frequency. This minimizes the frequency drift rate toward the resonant frequency of the tuned circuit.

Adjusting the Tuned Amplifier Frequency

Sustaining transitions received by frequency adjuster 40a trigger short energy pulses. These pulses are preferably no longer than 10% of each cycle of the oscillation produced by the tuned circuit in generator 50a. Their energy urges the low-Q tuned circuit to synchronize to the average period between pulses; bucking the tuned circuits' cyclic currents to slow oscillation, and boosting them to speed oscillation, within a limited oscillation frequency range about the tuned circuit resonant frequency. Sensitivity control signal 43 adjusts the energy in the energy pulses and hence the rate at which they can change the frequency of oscillating signal 52. In the initial radiating mode sensitivity is usually held at a fixed low level by user circuit 90 with user sensitivity switch 97 open.

Sustaining Mode in the Gaps

After radiating, a gap is left to allow transducer 93 to "ring" before it can successfully sense waves. Another gap may be left after sensing and before radiating again. During the gap the generator signal frequency is sustained, but will drift slowly toward the tuned circuit resonant frequency. The sensitivity is lowered by sensitivity control signal 43 from user circuit 90 to reduce drift.

Sensing Mode

Detector control signal 25 connects sensing transducer signal 21 to be detected. Detected-amplitude 24, and detected-cycle 22, signals are produced. Detected-amplitude signal 24 is fed forward via user a closed switch 97 to provide sensitivity signal 43. Detected-cycle signal 22 produces transitions in comparator signal 30 responsive to the sonic wave cycles sensed by transducer 93. Energy pulses are triggered by the transitions and influence the tuned circuit to produce generator signal 52 at the average frequency of the sonic waves synchronized to the average phase position of the detected-cycle transitions in comparator signal 32.

Synchronizer 100 will cause the radiated and returning waves to travel as efficiently as possible in medium 96 because the sound path is a portion of a generator feedback loop having a loop gain responsive to detected-amplitude 24. Synchronizer 100 automatically finds the optimum transmission frequency. Once sonic waves are established to and from transducer 93, modulation can be included to measure distance. Doppler modulation caused by the motion of reflecting surface 95 can be measured from comparator signal 35.

Figure 3:
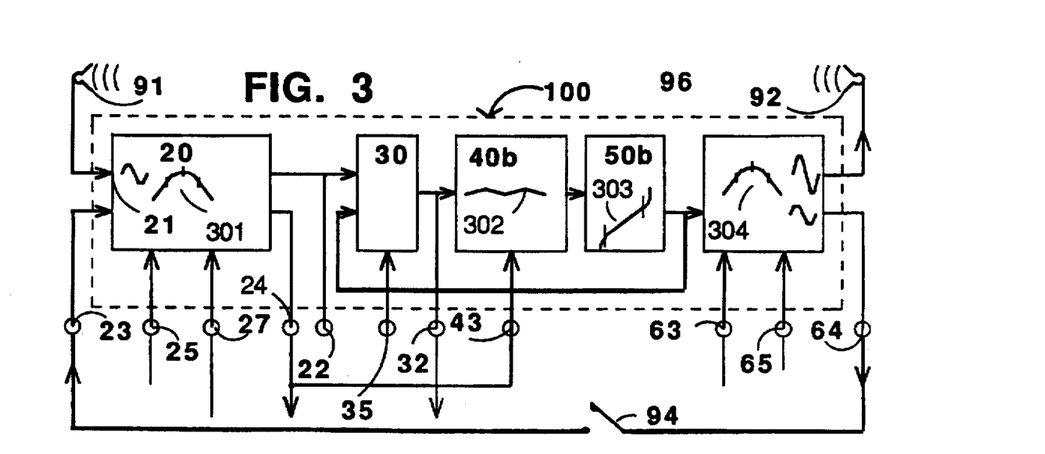
FIG. 3. Phase-locked-loop synchronizer schematic.

FIG. 3 shows synchronizer 100 driving radiating sonic transducer 92 and simultaneously sensing sonic waves with transducer 91. The waves travel in medium 96. Generator 50b is of the phase-locked loop (PLL) type. Reference signal 23 is needed because the PLL has a linear frequency response. It is necessary to establish a reference radiating frequency well within the end limits of the generator's adjusting range to allow for modulation. This embodiment is useful for accurate measurement of Doppler modulation in reflected or directly received waves, distance measurement, ultrasound scanning, and for communicating with other sonic wave synchronizers.

Synchronizer 100 operates in three modes for this application; a reference radiating mode, a simultaneous radiating and receiving mode, and a sustaining mode.

Establishing Sonic Reference Waves

To start radiating, control signal 65 switches driver 60 so that drive signal 62 causes transducer 92 to radiate sonic waves at a frequency within the adjusting range of generator 50b Drive-current signal 64 supplies reference signal 23 via closed user switch 94. Detector control signal 25 connects reference signal 23 to be detected. Detected-amplitude signal 24 is therefore, responsive to the amplitude of drive-current signal 64. Detected-cycle signal 22 is responsive to the drive-current signal cycles.

Comparator 30 produces comparator signal 32 as in the FIGS. 1 and 2 descriptions.

Frequency adjuster 40b uses comparator signal 32 to operate charge-current pumps to develop a voltage across an integrating filter to provide frequency adjusting signal 42 (also see FIG. 11) having frequency and phase responsive parameters responsive to time periods in comparator signal 32 intermediate between detected-cycle responsive transitions and generator signal responsive transitions.

Generator 50b includes a voltage adjustable oscillator influenced by frequency adjusting signal 42.

A phase-locked-loop (PLL) circuit is formed, including generator 50b, phase comparator 30, and frequency adjuster 40b. The frequency of generator signal 52, and the voltage of frequency adjusting signal 42 are interdependent. This feedback loop strives to adjust oscillating signal 52 to synchronize with the average frequency and period between transitions in comparator signal 32.

Amplitude Responsive Loop Gain

Detected-amplitude signal 24 provides sensitivity control signal 43 via an external connection. Therefore, the sensitivity and hence the loop gain of the PLL responds to the amplitude of drive-current signal 64, which is responsive to the amplitude of the alternating current flowing in radiating transducer 92. This makes the generator signal frequency strive to reach the frequency at which transducer alternating current is maximized.

If transducer 92 is has an admittance characteristic which does not peak within the desired radiating range, a low-Q peaking filter added to driver 60 can establish the reference frequency at which maximum drive current flows.

Sustaining Mode

A sustaining comparator signal 32 is produced as in the FIG. 2 description. An alternative provision for sustaining the generator signal frequency is to make the charge-current pumps operative only when the detected-cycle signal 22 is present.

Simultaneous Radiating and Sensing

The radiating mode establishes reference sonic waves prior to the simultaneous mode. Detector 20 is switched to detect transducer signal 21 from sensing transducer 91 and driver 60 is switched to cause transducer 92 to radiate. User switch 94 is left open. Transducer signal 21 is detected as in the FIGS. 1 and 2 descriptions. Synchronizer 100 will continually strive to adjust the frequency of the received and radiated waves so that an exact number of sonic waves is in the sound path separating the transducers. It will also strive to receive the waves at their greatest amplitude, as the loop gain of this closed loop is dependent on sensitivity signal 43 which responds to the amplitude of transducer signal 21. The detector selection switch is initially toggled several times by means of detector control signal 25 to break and make the loop to prevent the synchronizer from settling at a phase-locked condition away from the optimum frequency.

Figure 4:
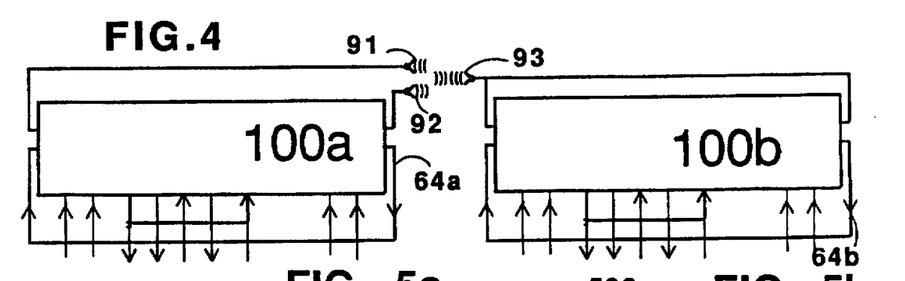
FIG. 4. Tuned amplifier synchronizers in two-way communication.

FIG. 4 Shows two tuned-amplifier synchronizers 100a and 100b in two-way communication. Synchronizer 100a drives a piezoelectric radiating transducer 92 and senses using a piezoelectric transducer 91. Synchronizer 100b drives a piezoelectric radiating and sensing transducer 93. The natural optimum radiating frequency of transducer 92 is matched to the natural optimum sensing frequency of transducer 93 and the natural optimum radiating frequency of transducer 93 is matched to the natural optimum sensing frequency of transducer 91.

Two-way Communication

The synchronizers either radiate or sense exclusively. Transducer 92 radiates at its optimum radiating frequency synchronized to drive-current signal 64a at the maximum transducer alternating current. Transducer 93 senses sonic waves from transducer 92 and synchronizer 100b locks to the frequency of the sensed waves. In reverse communication, transducer 93 radiates at its optimum radiating frequency synchronized to drive-current signal 64b at the maximum transducer alternating current. Transducer 91 senses sonic waves from transducer 93 and synchronizer 100a locks to the frequency of the sensed waves.

Synchronizers 100a and 100b cause transducers 91, 92, and 93, to communicate at their most efficient. Two-way communication of this kind avoids most interference from reflected sonic waves due to the limited frequency passband of the receiving transducer and the separate radiating and receiving frequencies.

Figure 5A:
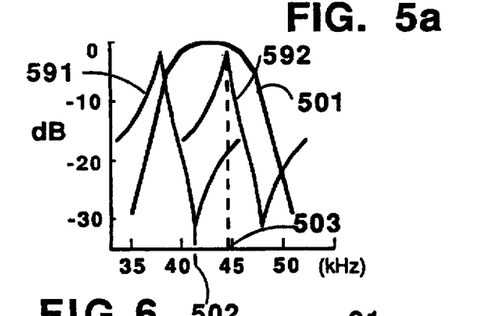
FIG. 5a. Synchronizer 100a and piezoelectric transducers (91 & 92) characteristics.

FIG. 5a relates to the FIG. 4 embodiment. It shows the low-Q tuned amplifier characteristic curve 501 for synchronizer 100a, and the admittance vs frequency characteristic curve 591 of transducer 91, and the admittance vs frequency characteristic curve 592 of transducer 92. Frequency 502 is the low admittance point of transducer 91 corresponding to its internal parallel resonance condition, where it produces the maximum voltage signal from sensed sonic waves. Frequency 503 is the high admittance point of transducer 92 corresponding to its internal series resonance condition where it produces the maximum radiating capability. Curve 501 is centered between frequencies 502 and 503 and is the resonant frequency of the tuned-amplifier in synchronizer 100a.

Figure 5B:
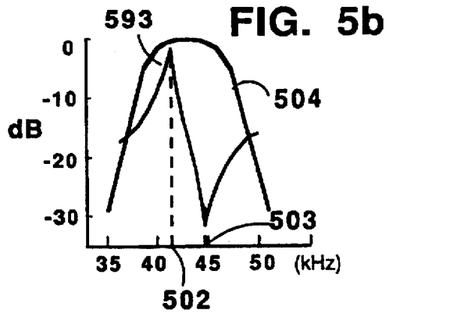
FIG. 5b. Synchronizer 100b and piezoelectric transducer (93) characteristics.

FIG. 5b relates to the FIG. 4 embodiment. It shows the low-Q tuned amplifier characteristic curve 504 for synchronizer 100b, and the admittance vs frequency characteristic curve 593 of transducer 93. Frequency 503 is the low admittance point of transducer 93 corresponding to an internal parallel resonance condition, where it produces the maximum voltage signal from sensed sonic waves. Frequency 502 is the high admittance point of transducer 93 corresponding to an internal series resonance condition, where it produces the maximum radiating capability. Curve 504 is centered between frequencies 502 and 503 and is the resonant frequency of the tuned-amplifier in synchronizer 100b.

Figure 6:
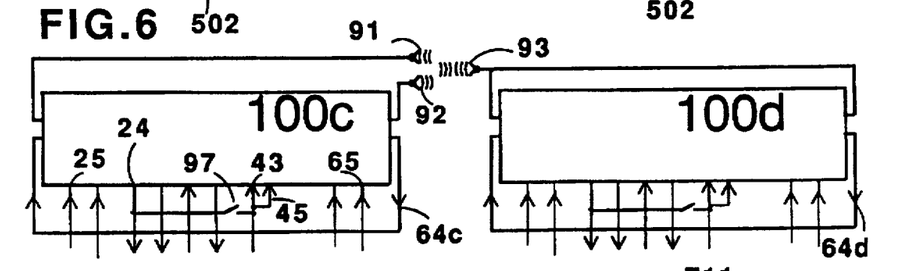
FIG. 6. Phase-locked-loop synchronizers in two-way communication.

FIG. 6 shows two PLL synchronizers 100c and 100d in two-way communication. Synchronizer 100c drives piezoelectric radiating transducer 92 and senses using piezoelectric transducer 91. Synchronizer 100d drives a piezoelectric radiating and sensing transducer 93. The natural optimum radiating frequency of transducer 92 is matched to the natural optimum sensing frequency of transducer 93 and the natural optimum radiating frequency of transducer 93 is matched to the natural optimum sensing frequency of transducer 91.

The synchronizers either radiate or sense exclusively. Transducer 92 radiates at its optimum radiating frequency synchronized to drive-current signal 64c at the maximum transducer alternating current. Transducer 93 senses sonic waves from transducer 92 and synchronizer 100d locks to the frequency of the sensed waves. In reverse communication, transducer 93 radiates at its optimum radiating frequency synchronized to drive-current signal 64d at the maximum transducer alternating current. Transducer 91 senses sonic waves from transducer 93 and synchronizer 100c locks to the frequency of the sensed waves.

Figure 7A:
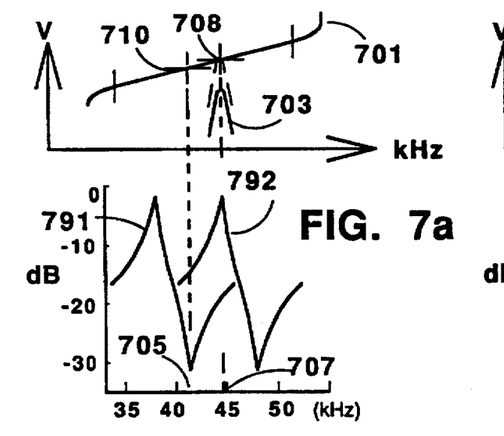
FIG. 7a. Synchronizer 100c and piezoelectric transducers (91 & 92) characteristics.

FIG. 7a relates to the FIG. 6 embodiment. It shows the analog oscillator voltage vs frequency characteristic 701 for synchronizer 100c, and the admittance vs frequency characteristic curve 791 of transducer 91, and the admittance vs frequency characteristic curve 792 of transducer 92. Frequency 705 is the low admittance point of transducer 91 corresponding to a parallel resonance condition internal to transducer 91 where it produces the maximum voltage signal from sensed sonic waves. Frequency 707 is the high admittance point of transducer 92 corresponding to a series resonance condition internal to transducer 92 where it produces the maximum radiating capability. Frequencies 705 and 707 are equidistant from the non-linear edges of characteristic 701. Curve 703 represents the peak alternating current when transducer 92 is radiating and the sensitivity control in the synchronizer responds to the transducer alternating current amplitude.

Curve 708 (broken line) represents a response curve relating the absolute operating position of a frequency controlling voltage when the frequency of the voltage-controlled oscillator of synchronizer 100c directly responds to the alternating current in transducer 92. See FIG. 11. Circuit adjustment is critical to achieve the optimum radiating frequency and maximum current at the absolute operating position.

Figure 7B:
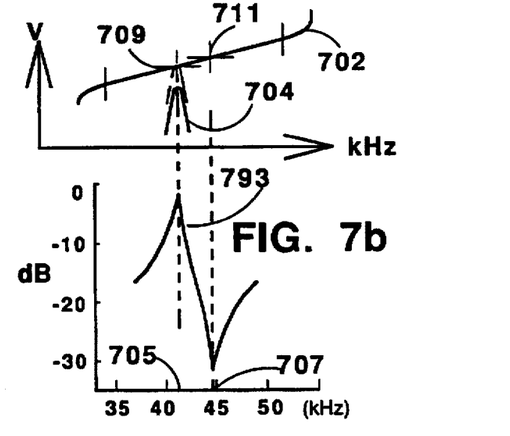
FIG. 7b. Synchronizer 100d and piezoelectric transducers (93) characteristics.

FIG. 7b relates to the FIG. 6 embodiment. It shows the analog oscillator voltage vs frequency characteristic 702 for synchronizer 100d, and the admittance vs frequency characteristic curve 793 of transducer 93. Frequency 707 is the low admittance point of transducer 93 corresponding to a parallel resonance condition internal to transducer 91 where it produces the maximum voltage signal from sensed sonic waves. Frequency 705 is the high admittance point of transducer 93 corresponding to a series resonance condition where it produces the maximum radiating capability. Frequencies 705 and 707 are equidistant from the non-linear edges of characteristic 702. Curve 704 represents the peak alternating current when transducer 93 is radiating and the sensitivity control in the synchronizer responds to the transducer alternating current amplitude.

Curve 709 (in broken line) represents a response curve relating the absolute operating position of a frequency controlling voltage when the frequency of the voltage-controlled oscillator of synchronizer 100d directly responds to the alternating current in transducer 93. See FIG. 11. Circuit adjustment is critical to achieve the optimum radiating frequency and maximum current at the absolute operating position.

Synchronizers 100c and 100d cause transducers 91, 92, and 93, to communicate at their most efficient. Two-way communication using limited frequency passband transducers and separate radiating and receiving frequencies avoids most interference from reverberating sonic waves.

Figure 8:
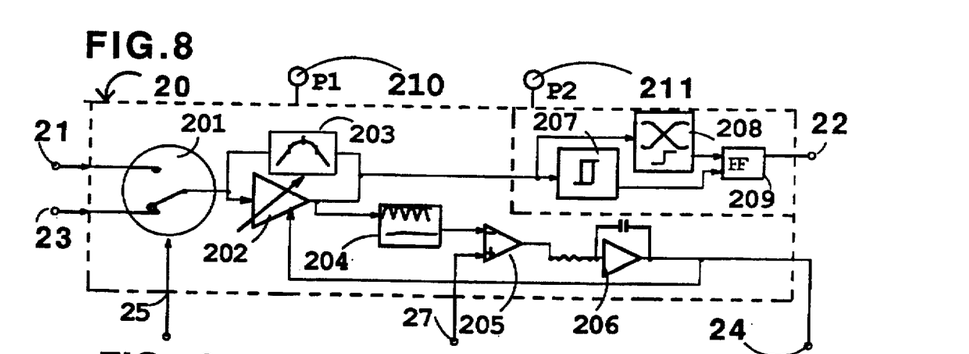
FIG. 8. A preferred embodiment of a detector circuit.

FIG. 8 shows a preferred embodiment of detector 20. Analog switch 201 responsive to detector control signal 25 connects either transducer signal 21 or reference signal 23 to amplifier 202. Filter 203 limits the frequency passband sensitivity of amplifier 202 and is usually necessary when the sensing transducer has a broad frequency passband. Amplitude detector 204 receives the amplified signal and produces a rectified voltage level responsive to its amplitude. Amplitude comparator 205 produces a difference signal responsive to the difference between the rectified voltage level and amplitude control signal 27 as a reference voltage. Integrating amplifier 206 removes high frequencies from the difference signal to produce detected-amplitude signal 24 which is fed back to a gain controlling input of amplifier 202. This negative feedback provides a controlled amplitude, amplified signal over a wide range of input signals, whereby the operating range of input signals is determined by amplitude control signal 27. Detected amplitude signal 24 responds to the amplitude of the signal being detected.

Schmitt trigger 207 receives the amplified signal and produces a digital output when the amplified signal exceeds the Schmitt threshold levels. Crossover detector 208 receives the amplified signal and forms a digital signal having transitions responsive to each zero-crossover point of the amplified signal. Flip flop 209 is set by one transition from the Schmitt trigger per signal cycle, and reset by one transition from the crossover detector per signal cycle to produce detected-cycle signal 22 responsive to each cycle of the signal from switch 201.

Power Saving Detection

An important feature of detector 20 can be useful for power saving. Only amplifier 202, rectifying amplitude detector 204, amplitude comparator 205 and integrating amplifier 206 in synchronizer 100 need to be powered via sensing power supply 210 until sonic waves are sensed. User circuit 90 will switch on main power supply 211 if detected amplitude signal 24 indicates recognition of sonic waves.

Figure 9:
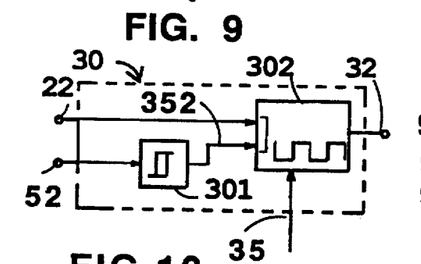
FIG. 9. Preferred embodiment of a comparator circuit.

FIG. 9 shows a preferred embodiment of comparator 30. generator signal 52 is compared with detected-cycle signal 22. If generator signal 52 is a sinewave, Schmitt trigger 301 forms a digital signal from it. Digital comparator 302 includes a look ahead and priority gate and latch to ensure that if detected cycle signals are present comparator signal 32 will respond to them. Phase control signal 35 can adjust the average relative phase relationship between positive and negative transitions in comparator signal 32.

Figure 9A:
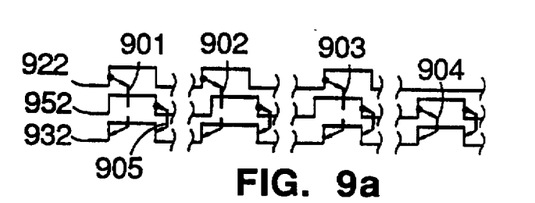
FIG. 9a. Typical waveforms from FIG. 9 embodiment.

FIG. 9a shows typical waveforms and dependency linkages showing the effects of the priority gate when detected-cycle signal 22 is average, early, late, and missing.

The detected-cycle signal waveform 922, generator signal waveform 952, and comparator signal waveform 932 are shown. Link 901 shows the positive transition of waveform 932 depending from the positive transition of waveform 922 when waveforms 922 and 952 are coincident. Link 902 shows the positive transition of waveform 932 depending from the positive transition of waveform 922 when it is earlier than waveform 952. Link 903 shows the positive transition of waveform 932 depending from the positive transition of waveform 922 when it is later than the 952 waveform. Link 904 shows the positive transition of waveform 932 depending from the positive transition of waveform 952 when waveform 922 is missing. Link 905 shows the negative transition of waveform 932 depending from the negative transition of waveform 952 under all conditions. Comparator waveform 932 is adjusted to be a square waveform, on average. Positive transitions respond to any modulation in the sonic waves, and the negative transitions respond to the stable generator signal 52.

Figure 10:
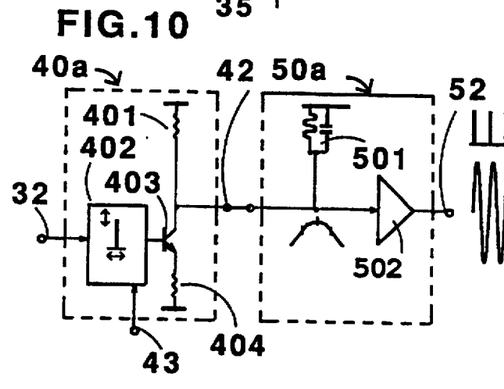

FIG. 10 shows a preferred frequency adjuster 40a and tuned-amplifier generator 50a. Comparator signal 32 (waveform 932 in FIG. 9a) triggers pulse generator 402 to form voltage pulses from its positive transitions having an amplitude responsive to sensitivity control signal 43. Transistor 403 and current control resistor 404 produce current pulses having an energy content responsive to the amplitude and duration of the voltage pulses. Generator 50a includes tuned circuit 501, stimulated to oscillate by the energy of the current pulses in frequency adjusting signal 42. Damping resistor 401 reduces the Q of tuned circuit 501. Amplifier 502 amplifies the oscillation.

Figure 10A:
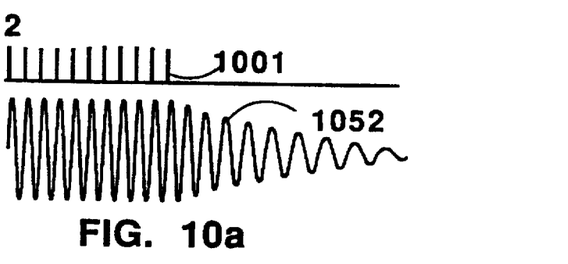
FIG. 10a. Typical waveforms from FIG. 10 embodiment.

FIG. 10a shows the voltage pulses 1001 produced by pulse generator 402 in FIG. 10. Oscillation waveform 1052 shows generator signal 52. Frequency adjuster signal 42 ceases when voltage pulses 1001 cease, and generator signal 52 reduces amplitude and frequency exponentially to zero. The generator signal frequency synchronizes to the average period between pulses 1001 and hence to the average frequency of comparator signal 32.

Figure 11:
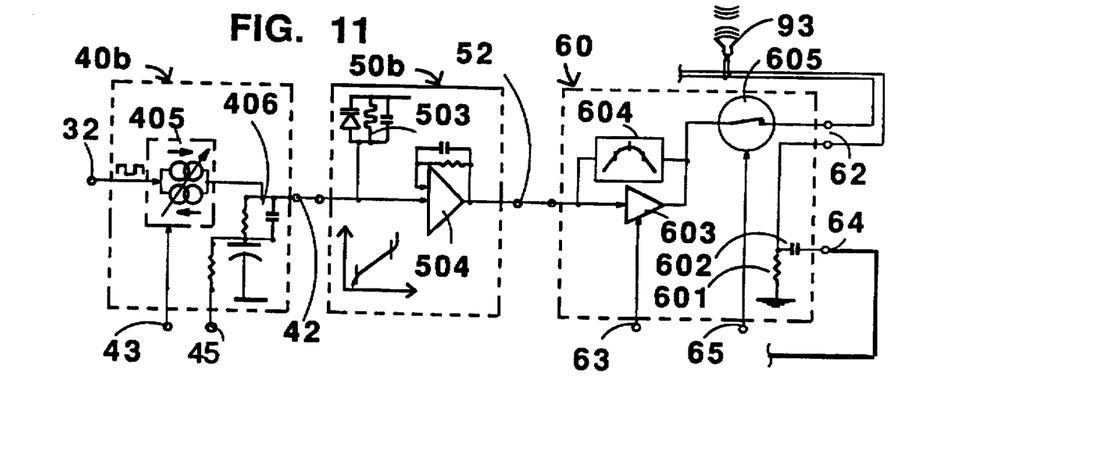
FIG. 11. A preferred embodiment of analog adjuster 40b, analog generator 50b, and driving circuit 60.

FIG. 11 shows frequency adjuster 40b and generator 50b for a PLL synchronizer. Comparator signal 32 drives bi-directional current pump 405 to charge and discharge filter 406 and produce controlled voltage frequency adjuster signal 42, including frequency and phase adjusting parameters. Generator 50b includes a voltage adjustable oscillator made from voltage controlled tuned circuit 503 responding to frequency adjuster signal 42; and oscillates due to positive feedback amplifier 504.

Current pump 405 pumps current at a rate responsive to sensitivity control signal 43. Direct frequency control can be included to control the frequency adjuster signal 42 responsive to a frequency control signal 45 (see FIG. 7a and 7b). Driver 60 includes: amplifier 603 receiving generator signal 52 and providing drive signal 62, and an output impedance suitable to cause sonic transducer 93 to radiate sonic waves, frequency peaking filter 604 providing peak transducer current at a preset frequency when transducer 93 is non-peaking, analog switch 605 for selectively connecting driver 60 to transducer 93 responding to radiate control signal 65, and resistor 601 providing drive-current signal 64 via capacitor 602 responsive to the alternating current flowing in radiating transducer 93. A circuit for modulating the amplitude of drive signal 62 responsive to an amplitude modulation signal 63 may also be included.

General

While the invention has been particularly shown and described in reference to preferred embodiments thereof, it will be understood by those skilled in the art that various modifications and changes in form and detail may be made therein without departing from the spirit and scope of the invention.

What I claim is:

1. A sonic wave synchronizer electronic circuit useful for interfacing electronic circuits with sonic transducers, comprising:

(a) a generator circuit (50) for producing a generator signal (52) having an average oscillator frequency at a sonic frequency, the frequency of the generator signal (52) being adjusted by a frequency adjuster signal (42);

(b) a driver circuit (60) responding to the generator signal (52) and providing a driver signal (62) for driving an external radiating sonic transducer, causing it to radiate sonic waves;

(c) a detector circuit (20) having an analog switch circuit for selecting one of two input signals to be detected, wherein one input signal is a reference signal (23), and the other is a transducer signal (21) from an external sensing sonic transducer, the selection being responsive to a detector control signal (25), the detector circuit (20) further comprising;

an amplitude detecting circuit providing a detected-amplitude signal (24) responsive to the amplitude of the selected input signal; and a cycle detecting circuit, providing a detected-cycle signal (22) responsive to the selected input signal and having at least one transition for each cycle of the input signal detected;

(d) a comparator circuit (30) receiving the detected-cycle signal (22) and the generator signal (52), and producing a comparator signal (32), wherein the comparator signal (32) includes transitions responsive to the generator signal (52), and transitions responsive to the detected-cycle signal (22), and time periods separating the detected-cycle signal responsive transitions and the generator signal responsive transitions, being responsive to the difference in phase and frequency between the generator and detected-cycle signals;

(e) a sustaining circuit causing the comparator signal (32) to be phase-neutral when the detected-cycle signal is not being received, wherein it prevents non-neutral transitions from being in the comparator signal (32) in response to missing detected-cycle signal transitions;

(f) a frequency adjuster circuit (40) receiving the comparator signal (32) and producing the frequency adjusting signal (42), continuously responding to the time periods between selected transitions in the comparator signal (32), wherein the frequency adjuster signal (42) cooperates with the generator (50) to cause a resistance to change, wherein the frequency change rate of the generator signal (52) is less than the frequency change rate of detected-cycle transitions in the comparator signal (32) so that the generator signal frequency synchronizes to an average of the detected cycle transition frequency.

2. The sonic wave synchronizer of claim 1, including a switching circuit for selectively connecting the driver circuit (60) to an external radiating transducer causing it to radiate sonic waves when connected, and causing the transducer to be electrically isolated from the driver circuit (60) when disconnected, the selective connection being responsive to a radiate control signal (65).

3. The sonic wave synchronizer of claim 1, wherein the detector circuit (20) includes a circuit for filtering the transducer signal (21) from the sensing sonic transducer to attenuate its amplitude when its frequency is outside a limited frequency range.

4. The sonic wave synchronizer of claim 1, wherein the driver circuit (60) includes a circuit for amplitude modulating the driver signal (62) responsive to an amplitude control signal (63).

5. The sonic wave interface synchronizer of claim 1, wherein it includes a circuit for phase modulating the driver signal (62) about the average frequency of the generator signal (52) responsive to a phase control signal.

6. The sonic wave synchronizer of claim 1, further comprising:

(a) the frequency adjuster circuit (40a) producing an energy pulse for each detected-cycle responsive transition, in the comparator signal (32) and for each phase-neutral transition, which is included in the comparator signal as an alternate for a missing detected-cycle transition;

(b) the generator circuit (50) comprising, the generator signal (52) synchronized to the mean timing position and pulse repetition frequency of the energy pulses, received by a tuned circuit (501) in the generator circuit (50), being urged to synchronism by the energy pulses bucking the tuned circuits' cyclic currents to slow oscillation, and boosting them to speed oscillation, and having a limited oscillation frequency range about a resonant frequency determined by the tuned circuit's components, the rate at which the generator signal frequency responds to changes in the repetition frequency of the energy pulses, being dependent on the energy content of the energy pulses.

7. The sonic wave synchronizer of claim 1, further comprising:

(a) the frequency adjuster circuit (40) comprising a circuit for charging and discharging (405) a filter circuit (406) responsive to the comparator signal (32) and apportioning phase and frequency influencing parameters to the frequency adjuster signal (42);

(b) the generator circuit (50) wherein its operating frequency is responsive to the voltage level of the frequency adjuster signal (42);

(c) a phase-locked-loop circuit, including the generator circuit (50), the comparator circuit (30), and the frequency adjuster circuit (40), wherein the frequency of the generator signal (52) and the voltage of the frequency adjuster signal (42) are interdependent, and form a negative feedback loop which strives to adjust the generator signal (52) to synchronize with the average frequency and phase position of the detected-cycle transitions in the comparator signal (32), the rate at which the generator signal frequency can respond to changes in the repetition frequency of the detected-cycle transitions being determined by the frequency adjuster circuit (40).

8. The sonic wave synchronizer of claim 1, wherein the difference between the frequency change rate of the generator signal (52) and the repetition frequency change rate of detected-cycle transitions in the comparator signal (32) is adjustable, responsive to a sensitivity control signal (43).

9. The sonic wave synchronizer of claim 8, wherein the driver circuit (60), provides a drive-current signal (64), having an amplitude responsive to the amplitude of alternating current flowing in the radiating sonic transducer.

10. The sonic wave synchronizer of claim 9, wherein the driver circuit (60) includes a frequency peaking circuit to define a frequency at which maximum alternating current will flow in the radiating transducer while it is radiating sonic waves.

11. A sonic wave synchronizer electronic circuit useful for interfacing electronic circuits with sonic transducers, comprising:

(a) a generator circuit (50) for producing a generator signal (52) having an average oscillator frequency at a sonic frequency, the frequency of the generator signal (52) being adjusted by a frequency adjuster signal (42);

(b) a detector circuit (20) having an input signal affected by an external sonic transducer, comprising;

an amplitude detecting circuit providing a detected-amplitude signal (24) responsive to the amplitude of the input signal; and a cycle detecting circuit, providing a detected-cycle signal (22) responsive to the input signal and having at least one transition for each cycle of the input signal detected;

(c) a comparator circuit (30) receiving the detected-cycle signal (22) and the generator signal (52), and producing a comparator signal (32), wherein the comparator signal (32) includes transitions responsive to the generator signal (52), and transitions responsive to the detected-cycle signal (22), and time periods separating the detected-cycle signal responsive transitions and the generator signal responsive transitions, being responsive to the difference in phase and frequency between the generator and detected-cycle signals;

(d) a sustaining circuit causing the comparator signal (32) to be phase-neutral when the detected-cycle signal is not being received, wherein it prevents non-neutral transitions from being in the comparator signal (32) in response to missing detected-cycle signal transitions;

(e) a frequency adjuster circuit (40) receiving the comparator signal (32) and producing the frequency adjusting signal (42), continuously responding to the time periods between selected transitions in the comparator signal (32), wherein the frequency adjuster signal (42) cooperates with the generator (50) to cause a resistance to change, wherein the frequency change rate of the generator signal (52) is less than the frequency change rate of detected-cycle transitions in the comparator signal (32) so that the generator signal frequency synchronizes to an average of the detected cycle transition frequency;

(f) the frequency change rate of the generator signal (52) relative to the repetition frequency change rate of detected-cycle transitions in the comparator signal (32) being adjustable, responsive to a sensitivity control signal (43).

12. The sonic wave synchronizer of claim 11, wherein the detector circuit (20) includes a circuit for filtering the input signal (21) to attenuate its amplitude when its frequency is outside a limited frequency range.

13. The sonic wave synchronizer of claim 11, further comprising:

(a) the frequency adjuster circuit (40a) producing an energy pulse for each detected-cycle responsive transition, in the comparator signal (32) and for each phase-neutral transition, which is included in the comparator signal as an alternate for a missing detected-cycle transition;

(b) the generator circuit (50) comprising, the generator signal (52) synchronized to the mean timing position and pulse repetition frequency of the energy pulses, received by a tuned circuit (501) in the generator circuit (50), being urged to synchronism by the energy pulses bucking the tuned circuits' cyclic currents to slow oscillation, and boosting them to speed oscillation, and having a limited oscillation frequency range about a resonant frequency determined by the tuned circuit's components, the rate at which the generator signal frequency responds to changes in the repetition frequency of the energy pulses, being dependent on the energy content of the energy pulses.

14. The sonic wave synchronizer of claim 11, further comprising:

(a) the frequency adjuster circuit (40) comprising a circuit for charging and discharging (405) a filter circuit (406) responsive to the comparator signal (32) and apportioning phase and frequency influencing parameters to the frequency adjuster signal (42);

(b) the generator circuit (50) wherein its operating frequency is responsive to the voltage level of the frequency adjuster signal (42);

(c) a phase-locked-loop circuit, including the generator circuit (50), the comparator circuit (30), and the frequency adjuster circuit (40), wherein the frequency of the generator signal (52) and the voltage of the frequency adjuster signal (42) are interdependent, and form a negative feedback loop which strives to adjust the generator signal (52) to synchronize with the average frequency and phase position of the detected-cycle transitions in the comparator signal (32), the rate at which the generator signal frequency can respond to changes in the repetition frequency of the detected-cycle transitions being determined by the frequency adjuster circuit (40).

15. The sonic wave synchronizer of claim 11, including a driver circuit (60) responding to the generator signal (52) and providing a driver signal (62) for driving an external radiating sonic transducer, causing it to radiate sonic waves.

16. The sonic wave synchronizer of claim 15, including a switching circuit for selectively connecting the driver circuit (60) to an external radiating transducer causing it to radiate sonic waves when connected, and causing the transducer to be electrically isolated from the driver circuit (60) when disconnected, the selective connection being responsive to a radiate control signal (65).

17. The sonic wave synchronizer of claim 15, wherein the driver circuit (60) includes a circuit for amplitude modulating the driver signal (62) responsive to an amplitude control signal (63).

18. The sonic wave interface synchronizer of claim 15, wherein it includes a circuit for phase modulating the driver signal (62) about the average frequency of the generator signal (52) responsive to a phase control signal.

19. The sonic wave synchronizer of claim 15, wherein the driver circuit (60), provides a drive-current signal (64), having an amplitude responsive to the amplitude of alternating current flowing in the radiating sonic transducer.

20. The sonic wave synchronizer of claim 15, wherein the driver circuit (60) includes a frequency peaking circuit to define a frequency at which maximum alternating current will flow in the radiating transducer while it is radiating sonic waves.

* * * * *